(12) United States Patent
Chausset

(10) Patent No.: US 7,374,201 B2
(45) Date of Patent: May 20, 2008

(54) ENCLOSURE PART FOR AUTOMOTIVE VEHICLES, WITH A PANEL SUITABLE FOR CONCEALING AN INFLATABLE AIRBAG

(75) Inventor: François Chausset, Saint Maur (FR)

(73) Assignee: Mollertech, Verrieres le Buisson (FR)

( * ) Notice: Subject to any disclaimer, the term of this patent is extended or adjusted under 35 U.S.C. 154(b) by 287 days.

(21) Appl. No.: 10/922,175

(22) Filed: Aug. 20, 2004

(65) Prior Publication Data

US 2005/0040629 A1    Feb. 24, 2005

(30) Foreign Application Priority Data

Aug. 22, 2003   (FR) .................................. 03 10111

(51) Int. Cl.
*B60R 21/20* (2006.01)
(52) U.S. Cl. ................ 280/728.3; 280/730.2; 280/733
(58) Field of Classification Search ............. 280/728.2, 280/728.3, 730.2, 732, 733, 743.2
See application file for complete search history.

(56) References Cited

U.S. PATENT DOCUMENTS 5,308,112 A * 5/1994 Hill et al. ................. 280/730.2
5,538,099 A * 7/1996 Blackburn et al. ........... 180/282
5,779,262 A * 7/1998 Totani et al. ............. 280/728.3
5,863,062 A * 1/1999 Harada et al. ............ 280/728.3
6,106,005 A * 8/2000 Heinz et al. .............. 280/730.2
6,341,796 B1 * 1/2002 Preisler .................... 280/728.3
6,371,514 B1 * 4/2002 Bombard .................. 280/730.2
6,378,896 B1 * 4/2002 Sakakida et al. ......... 280/730.2
7,100,941 B2 * 9/2006 Riha et al. ................ 280/728.3
2001/0023011 A1   9/2001 Preisler et al.
2001/0038195 A1  11/2001 Cuevas et al.
2003/0001364 A1 * 1/2003 Welch et al. ............. 280/730.2
2004/0212178 A1 * 10/2004 Riesinger et al. ......... 280/730.2
2005/0052005 A1 * 3/2005 Lunt et al. ............... 280/730.2
2005/0127641 A1 * 6/2005 Cowelchuk et al. ...... 280/728.3

FOREIGN PATENT DOCUMENTS

FR         2 792 271      10/2000

* cited by examiner

*Primary Examiner*—Toan C To
(74) *Attorney, Agent, or Firm*—Leydig, Voit & Mayer, Ltd.

(57) ABSTRACT

An interior enclosure part for automotive vehicles equipped with an airbag includes a rigid frame having an opening located in front of the inflatable airbag, and a panel blocking the opening. The part includes a closed-contour latching assembly surrounding the opening and rigidly attached to the frame. The panel has a peripheral rim pinched between the latching assembly and the frame. The panel includes a layer of plastic material and a flexible covering molded onto the layer of plastic material.

19 Claims, 5 Drawing Sheets

Figure 1:
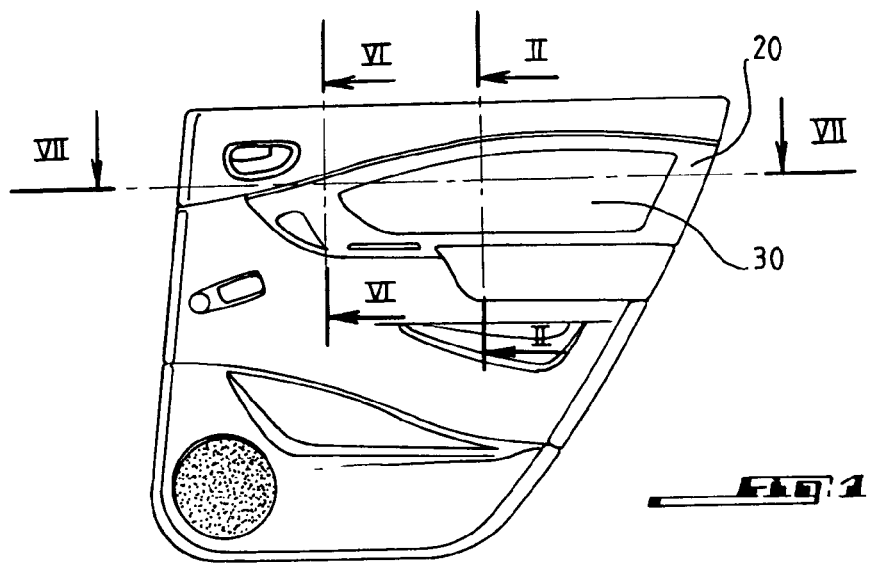

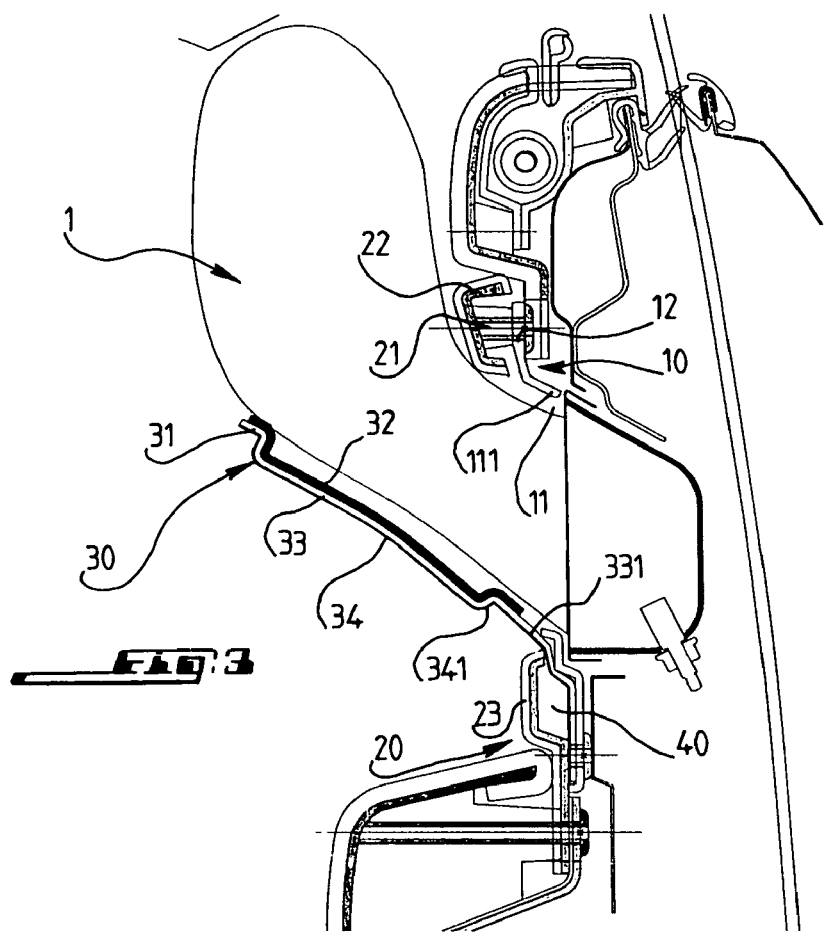
Fig. 3
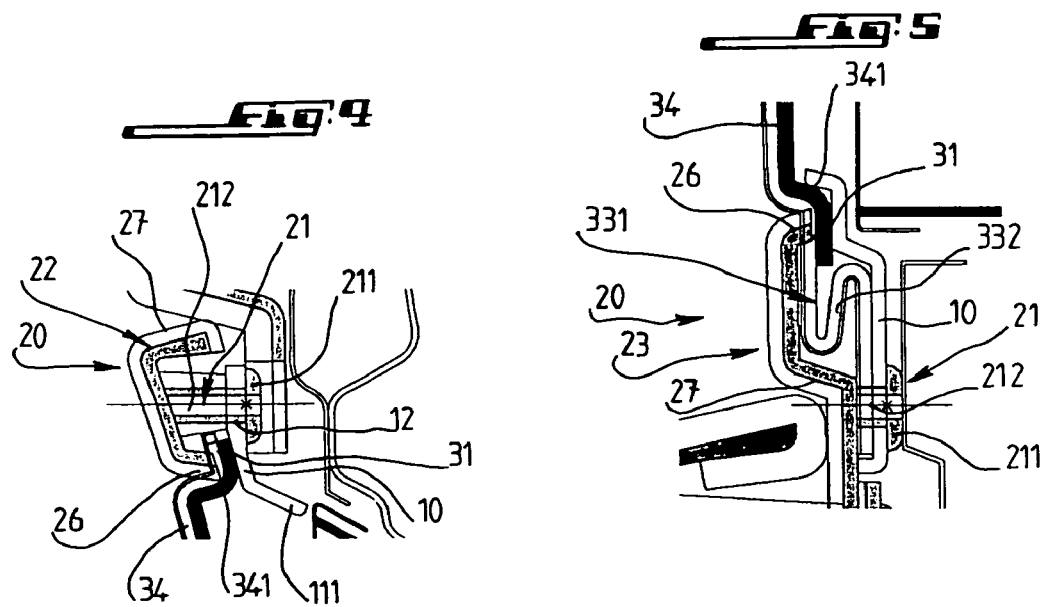
Fig. 4
Fig. 5

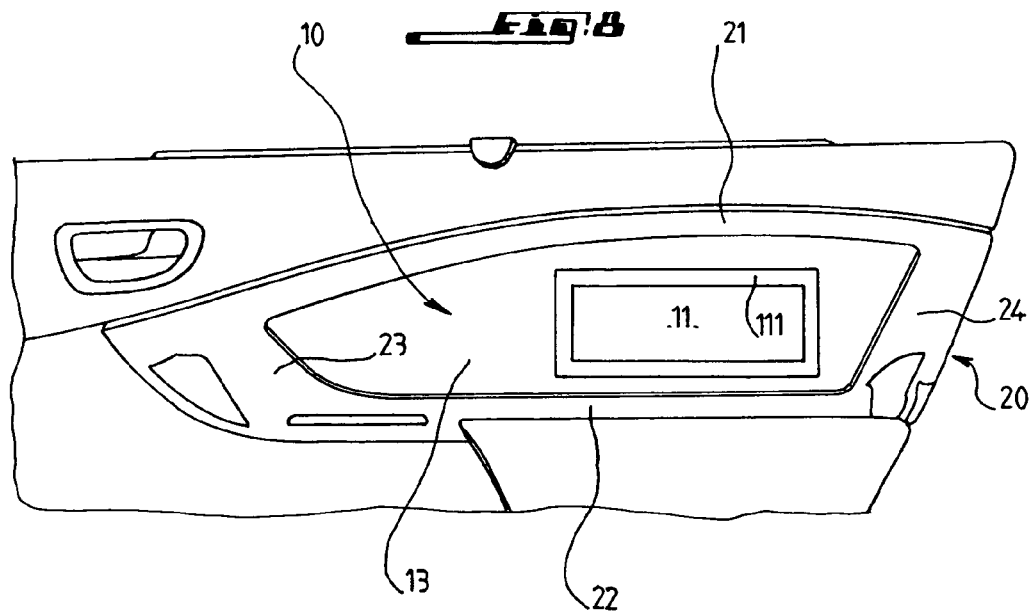
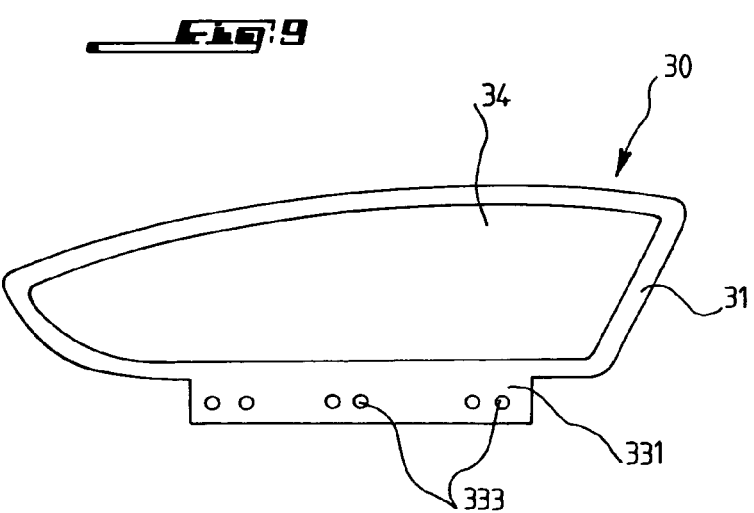

ENCLOSURE PART FOR AUTOMOTIVE VEHICLES, WITH A PANEL SUITABLE FOR CONCEALING AN INFLATABLE AIRBAG

FIELD OF THE INVENTION

More precisely, the invention concerns an enclosure part for an automotive vehicle equipped with an inflatable airbag, including a rigid frame having an opening located in front of the inflatable airbag and a panel blocking the opening.

BACKGROUND

Enclosures of this type are known in the prior art, in particular EP No. 1,167,131, which describes a panel mounted on the frame by a joint that allows the panel to pivot when the airbag deploys. This type of assembly is mechanically complex, and leads to additional manufacturing costs.

U.S. Pat. No. 5,427,409 discloses a panel attached to its support by tongues of material that break when the airbag deploys. The construction of parts with such tongues is delicate.

SUMMARY OF THE INVENTION

In this context, the invention intends to alleviate the defects mentioned above and to propose a piece of equipment of particularly simple construction.

Toward this end, the enclosure part of the invention, includes a closed-contour latching assembly surrounding the opening and rigidly attached to the frame, the panel being attached to the frame by a peripheral rim pinched between the latching assembly and the frame, the panel comprising a layer of plastic material of an appropriate flexibility that extends at least over the peripheral rim and a flexible covering molded onto the layer of plastic material.

In one possible embodiment of the invention, the covering includes an unmolded restraining area over the layer of plastic material that is rigidly attached to a fixed point, for example, the frame or the latching assembly, constituting a restraining strap for the panel when the airbag inflates.

The part according to the invention can also advantageously have one or more of the following characteristics:

- The restraining area of the covering normally forms several folds arranged in a housing located between the frame and the latching assembly, the folds deploying when the airbag inflates.
- The restraining area projects in relation to an edge of the layer of plastic material, the area having an elongated shape parallel to the edge.
- The latching assembly includes attachment legs irreversibly engaged in attachment orifices in the frame, keeping the space between the latching assembly and the frame constant.
- The restraining area has restraining holes which the attachment legs go through before engaging in the attachment orifices.
- The covering is a non-tearing fabric of the chain stitch or jersey type.
- The plastic material that forms the layer is composed of polypropylene combined with an elastic material, for example, ethylene-propylene-diene (EPDM).
- The opening has inclined edges forming guides for deploying the inflatable airbag.

According to a second aspect, the part having the above characteristics is applied to the construction of a piece of equipment for automotive vehicle side doors in which an inflatable airbag is housed.

BRIEF DESCRIPTION OF DRAWING FIGURES

Figure 2:
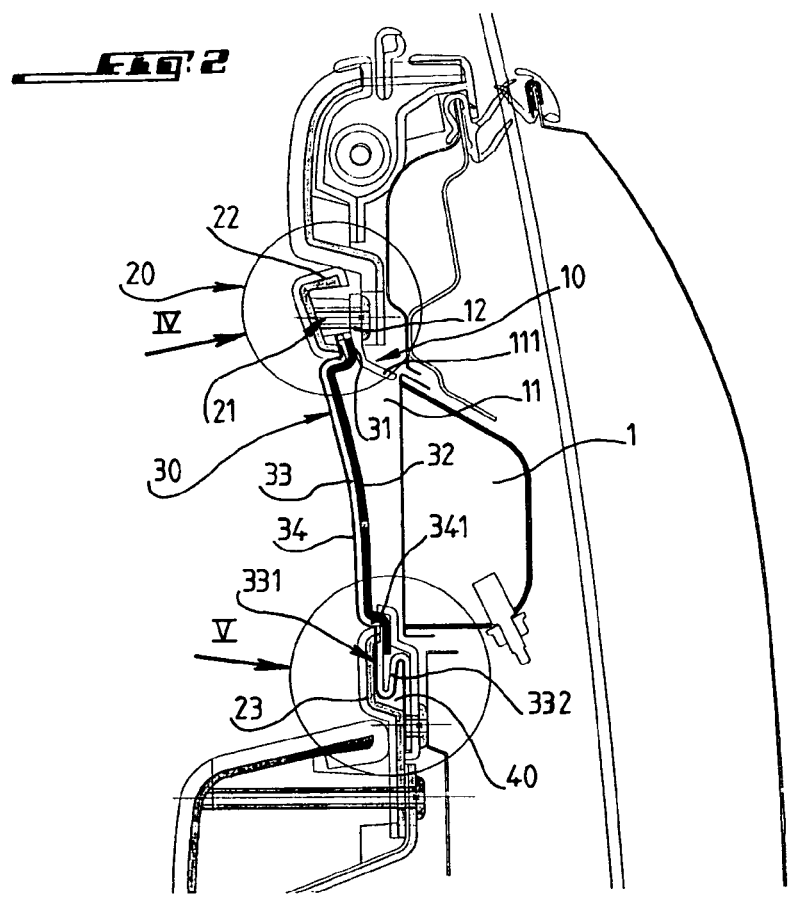
Figure 6:
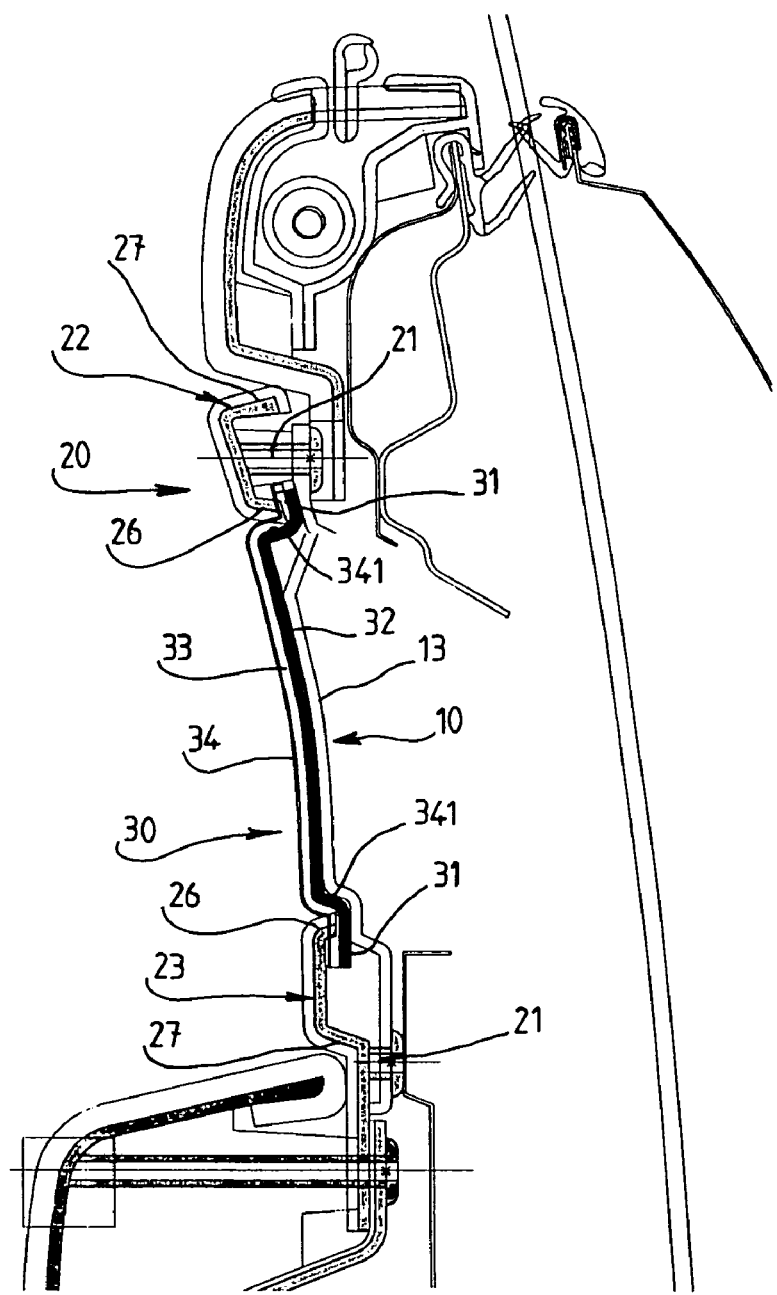
Figure 7:
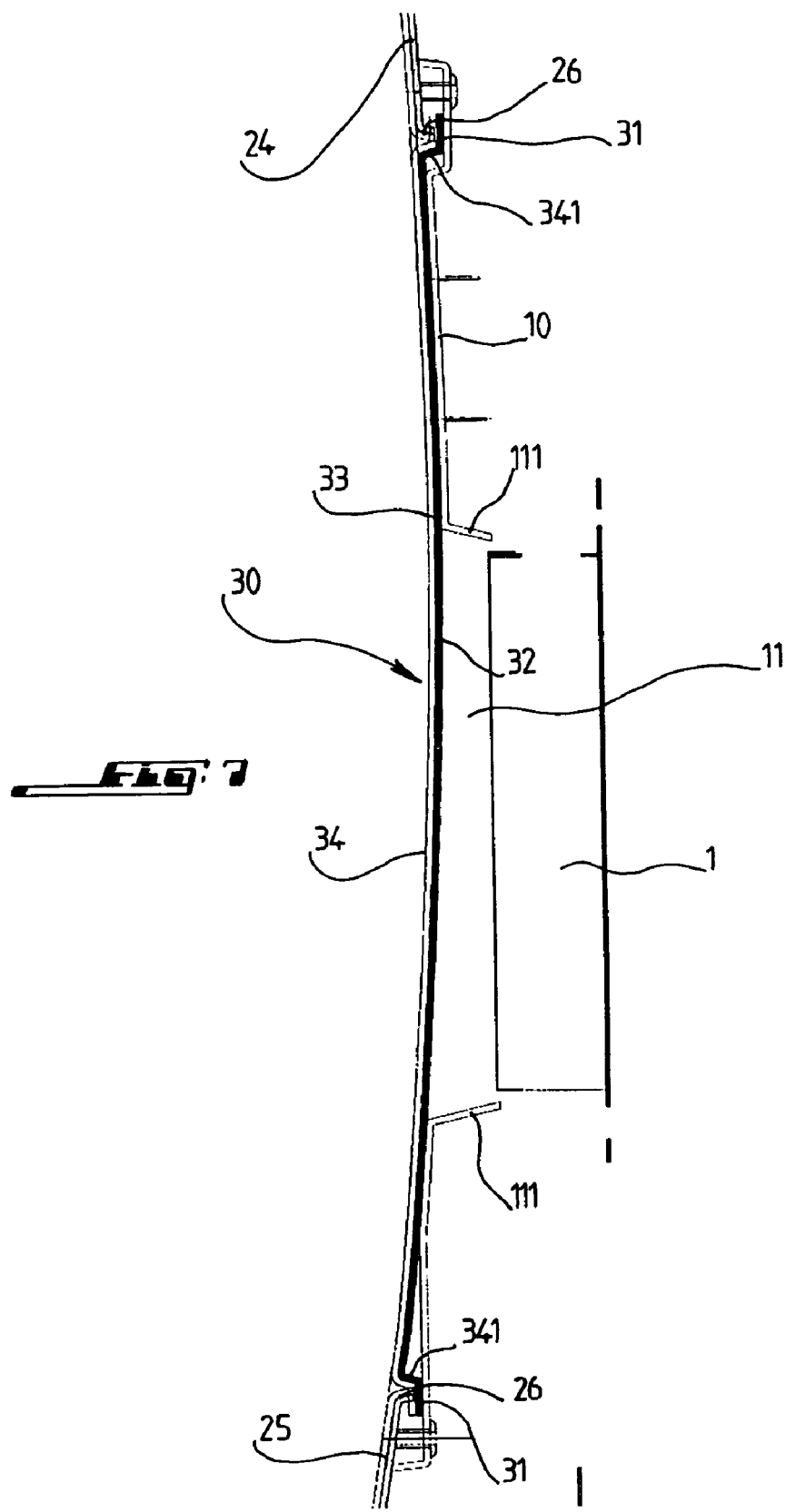

Other characteristics and advantages of the invention will become clear from the description given below, in an indicative and no way limiting manner, in reference to the attached figures, among which:

FIG. 1 is a front view of an automotive vehicle side door furnished with a piece of equipment according to the invention, FIG. 2 is a vertical cross section of the door in FIG. 1, considered under the incidence of arrows II of FIG. 1, the inflatable airbag being represented in the folded condition, FIG. 3 is a view similar to that of FIG. 2, the inflatable airbag being represented in the act of deployment and the panel being represented as ejected by the airbag, FIGS. 4 and 5 are enlarged views, respectively, of Details IV and V of FIG. 2, FIG. 6 is a vertical cross section of the door in FIG. 1, considered under the incidence of arrows VI of FIG. 1, FIG. 7 is a longitudinal cross section of the door in FIG. 1, considered under the incidence of arrows VII of FIG. 1, FIG. 8 is a view similar to that of FIG. 1, the panel not being represented in order to show the opening in the frame, and FIG. 9 is a front view of the panel in FIG. 1.

DETAILED DESCRIPTION

FIGS. 1 and 2 represent the lower part of an automotive vehicle side door, covered on an interior side by an enclosure part.

An inflatable airbag (1) is arranged inside the door. It is normally in a folded condition and deploys, under predetermined conditions, when the vehicle suffers an impact.

FIGS. 2 and 8 show that the enclosure part consists of a rigid frame (10) having an opening (11), located in front of inflatable airbag (1), and a panel (30) blocking the opening while airbag (1) remains in the folded condition.

In case of impact, airbag (1) deploys inside the vehicle through opening (11), panel (30) being ejected by the pressure exercised by airbag (1).

Frame (10) is rigidly attached to a structural part of the vehicle door. Its opening (11) has a rectangular shape, as shown in FIG. 8, with a long longitudinal side and a short vertical side.

According to the invention, the enclosure part consists of a closed-contour latching assembly (20) surrounding opening (11) and rigidly attached to frame (10), panel (30) being attached to frame (10) by a peripheral rim (31) pinched between latching assembly (20) and frame (10).

Panel (30) itself consists of a layer of plastic material (32) and a flexible covering (33) molded onto the layer of plastic material (32). The layer of plastic material extends at least to peripheral rim (31), and generally extends over the entire surface of the panel.

Covering (33) serves, among other things, a decorative function and faces towards the interior of the vehicle. The layer of plastic material (32) gives its shape to the panel and serves as support for the covering, but as will be seen further on, it also has an appropriate elasticity to allow peripheral rim (31) to slide and disengage from latching assembly (20) under the pressure of airbag (1) when it inflates.

According to another particularly important characteristic of the invention, covering (33) includes a restraining area (331) that is not placed over the layer of plastic material (32) and is rigidly attached to a fixed point. This area constitutes a restraining strap for panel (30) when the airbag inflates, so that panel (30) cannot become a projectile and injure the occupants of vehicle.

The plastic material forming layer (32) is composed of polypropylene combined with an elastic material, for example, ethylene-propylene-diene terpolymer (EPDM).

This material allows the reconciliation of the elasticity constraints, in order to allow the disengagement and ejection of panel (30), and the mechanical strength of panel (30).

Covering (33) must reconcile a decorative function and an imperative of mechanical strength under tension, in order to restrain panel (30) when airbag (1) deploys.

This covering is typically a non-tearing fabric, consisting of a layer that confers the desired appearance to the fabric, which is mounted on a weave that confers its strength to the fabric.

Fabrics of the chain stitch or jersey type are suitable for building panel (30).

The exact nature of the fabric and of the plastic material, the thickness of the layer of plastic material (32) and the detailed technical characteristics of the fabric are determined by calculations, possibly followed by tests under representative conditions, in terms of the size and spatial shape of the panel, the geometric characteristics of the latching assembly and the type of inflatable airbag (1), in particular, of the pressure exercised on the panel when the airbag deploys, and the energy with which the panel is ejected.

Covering (33) is molded onto the layer of plastic material (32), for example, by using the so-called low-pressure injection technique described in FR No. Patent 2,702,990. According to this technique, the covering is introduced into the cavity of a mold, the mold is closed and the plastic material is injected in a melted state under low pressure on one side of the covering. Under the pressure of the melted plastic material, the covering is flattened against a wall of the mold. Once the plastic material has solidified, the part is ejected from the mold.

As shown in FIGS. 6-8, frame (10) is a thin plate, including a roughly flat central part (13) in which opening (11) is cut.

It can be seen in FIGS. 3 and 7 that opening (11) has inclined edges (111) forming guides for deploying inflatable airbag (1). Inclined edges (111) stand on one face of the frame opposite the interior of the vehicle, that is, toward inflatable airbag (1), and incline toward the center of opening (11).

Frame (10) is made of a plastic material, by injection molding.

Latching assembly (20) surrounds opening (11), at a distance from inclined edges (111), as shown in FIG. 8. It includes mutually opposite upper and lower arms (22) and (23), joined by front and back arms (24) and (25), all of material, these four arms forming an elongated central space in a longitudinal direction.

Each arm has a U-shaped concave section, with the hollow turned toward frame (10). Interior branch (26) of the U, located on the side of the central space in latching assembly (20), is relatively shorter than branch (27), located on an exterior side of latching assembly (20).

Peripheral rim (31) of panel (30) is pinched in its entire length, between interior branch (26) and central part (13) of frame (10), on a small width in relation to the total dimensions of panel (30).

The central space of latching assembly (20) is defined by the respective interior branches (26) of the four upper, lower, front and back arms (22)-(25).

Latching assembly (20) includes rigid attachment legs (21), made of the same material as arms (22)-(25) irreversibly engaged in attachment orifices (12) of frame (10). A first type of leg (21) is shown in FIG. 4, and consists of a rod (212) extending from latching assembly (20) toward frame (10) and engaging in attachment orifices (12), and a head (211), interdependent with one end of rod (212). Ribs extend along rod (212) to orifice (12). Head and ribs are respectively located on a first side of frame (10), turned toward the inflatable airbag, and on a second side opposite the first, such that the edges of attachment orifice (12) are pinched between head (211) and the ends of the ribs.

A second type of leg (21) is represented in FIG. 5, and includes a rod (212) extending from lower arm (23) of latching assembly (20) toward attachment orifice (12) and engaging this attachment orifice (12), and a head (211) that extends the rod and is arranged on one side of frame (10), turned toward airbag (1). The rod is short, so that the edges of attachment orifice (12) are pinched between head (211) and the arm of the latching assembly to which the rod is attached.

Latching assembly (20) includes several legs of one or the other type distributed along its four arms.

These legs allow a constant space to be maintained between latching assembly (20) and frame (10), thereby controlling the force with which panel (30) is pinched between latching assembly (20) and frame (10).

Latching assembly (20) is made of plastic material, by injection molding.

Panel (30) has a longitudinally elongated shape. Seen in cross section, as in FIGS. 6 and 7, it includes a flat central plate (34), extending parallel to and in contact with central part (13) of frame (10), surrounded by a raised edge (341) projecting toward inflatable airbag (1). Peripheral rim (31) extends raised edge (341) toward the exterior of the panel, parallel to central plate (34). Central plate (34) has a shape that exactly matches that of the central space of latching assembly (20). As shown in FIG. 4, interior branch (26) rests on the angle between raised edge (341) and peripheral rim (31).

The layer of plastic material (32) generally covers central plate (34), raised edge (341) and peripheral rim (31) at the same time.

As shown in FIG. 9, restraining area (331) of covering (33) projects with regard to an edge of the layer of plastic material (32), the area having an elongated rectangular shape parallel to said edge.

The edge constitutes a part of peripheral rim (31) located beside lower arm (23) of latching assembly (20) when panel (30) is in place.

Restraining area (331) has three pairs of two restraining holes (333) that attachment legs (21) of latching assembly (20) go through before engaging in attachment orifices (12) of frame (10).

The three pairs of holes (333) are regularly spaced along restraining area (331), at both ends and in the center of it. The two holes (333) of each pair are arranged at a short distance from each other in relation to the distances separating the pairs.

FIGS. 2 and 5 show that, when panel (30) is in place over latching assembly (20), restraining area (331) of covering (33) forms several folds (332) between restraining holes (333) and peripheral rim (31). These folds are arranged in a housing (40) located between frame (10) and lower arm (23) of latching assembly (20).

These folds (332) deploy when airbag (1) inflates, as shown in FIG. 3. The presence of these folds (332) allows the part of peripheral rim (31) bordered by restraining area (331) to disengage from latching assembly (20).

FIG. 5 shows that housing (40) matches the interior space of the U formed by lower arm (23).

It will be observed that, in a non-illustrated variant embodiment, restraining area (331) may be rigidly attached, not to frame (10) or latching assembly (20), but to a fixed point of the door, for example, a part of the structure.

The enclosure part described above is perfectly adapted to the construction of an automotive vehicle door in which an inflatable airbag is housed. It can also be used to hide an inflatable airbag housed in the dashboard or in the middle of the steering wheel.

It is understood that the enclosure part of the invention is particularly simple and easy to assemble. It includes only three items. The restraining strap, which is generally a separate item from the panel and may be delicate to assemble, is very simply composed of a part of the panel covering. The panel is held in position on the frame in front of the opening by simply pinching its peripheral rim between the latching assembly and the frame. It is therefore not attached to the frame by complex means such as hinges.

In addition, the enclosure part is inexpensive and can be pre-assembled by the supplier and then mounted as one piece in the automotive vehicle.

The invention claimed is:

1. An interior enclosure part for automotive vehicles equipped with an airbag, comprising:
a rigid frame having an opening located in front of an inflatable airbag;
a panel blocking the opening;
a closed-contour latching assembly surrounding the opening and rigidly attached to the frame;
a peripheral rim attaching the panel to the frame, the peripheral rim being pinched between the latching assembly and the frame, the panel including a layer of a flexible plastic material extending at least over the peripheral rim;
a flexible covering molded onto the layer of flexible plastic material, wherein the covering includes a restraining area not molded onto the layer of flexible plastic material and rigidly attached to a fixed point; and
a restraining strap for the panel when the air bag inflates.

2. The part according to claim 1, wherein the restraining area of the covering includes a plurality of folds located in a housing between the frame and the latching assembly, the folds unfolding when the airbag inflates.

3. The part according to claim 1, wherein the restraining area projects with regard to an edge of the layer of flexible plastic material, the restraining area having an elongated shape parallel to the edge.

4. The part according to claim 1, wherein the latching assembly includes attachment legs irreversibly engaged in attachment orifices in the frame and maintaining a constant space between the latching assembly and the frame.

5. The part according to claim 4, wherein the restraining area includes restraining holes through which the attachment legs pass before engaging the attachment orifices.

6. The part according to claim 1, wherein the covering is a non-tearing fabric.

7. The part according to claim 1, wherein the layer of the flexible plastic material is polypropylene combined with an elastic material.

8. The part according to claim 7 wherein the elastic material is ethylene-propylene-diene.

9. The part according to claim 1, wherein the opening has inclined edges forming guides for deploying the airbag.

10. An interior enclosure part for automotive vehicles equipped with an airbag, comprising:
a rigid frame having an opening located in front of an inflatable airbag;
a panel blocking the opening;
a closed-contour latching assembly surrounding the opening and rigidly attached to the frame;
a peripheral rim attaching the panel to the frame, the peripheral rim being pinched between the latching assembly and the frame before the airbag is inflated and disengaged from the latching assembly and the frame when the airbag inflates, the panel including a layer of a flexible plastic material extending at least over the peripheral rim so that the peripheral rim slides relative to the frame and the latching assembly, disengaging from the latching assembly, when the airbag inflates; and
a flexible covering molded onto the layer of flexible plastic material.

11. The part according to claim 10, wherein the covering includes a restraining area not molded onto the layer of flexible plastic material, rigidly attached to a fixed point, and including a restraining strap for the panel when the airbag inflates.

12. The part according to claim 11, wherein the restraining area of the covering includes a plurality of folds located in a housing between the frame and the latching assembly, the folds unfolding when the airbag inflates.

13. The part according to claim 11, wherein the restraining area projects with regard to an edge of the layer of flexible plastic material, the restraining area having an elongated shape parallel to the edge.

14. The part according to claim 11, wherein the latching assembly includes attachment legs irreversibly engaged in attachment orifices in the frame and maintaining a constant space between the latching assembly and the frame.

15. The part according to claim 14, wherein the restraining area includes restraining holes through which the attachment legs pass before engaging the attachment orifices.

16. The part according to claim 10, wherein the covering is a non-tearing fabric.

17. The part according to claim 10, wherein the layer of the flexible plastic material is polypropylene combined with an elastic material.

18. The part according to claim 17 wherein the elastic material is ethylene-propylene-diene.

19. The part according to claim 10, wherein the opening has inclined edges forming guides for deploying the airbag.

\* \* \* \* \*